(12) United States Patent
Dussud et al.

(10) Patent No.: US 7,433,862 B1
(45) Date of Patent: Oct. 7, 2008

(54) DECLARATIVE PINNING

(75) Inventors: Patrick H. Dussud, Bellvue, WA (US); Vance P. Morrison, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 10/865,546

(22) Filed: Jun. 10, 2004

Related U.S. Application Data

(60) Division of application No. 09/873,803, filed on Jun. 4, 2001, now Pat. No. 6,898,611, which is a continuation-in-part of application No. 09/803,240, filed on Mar. 8, 2001, now Pat. No. 6,598,141.

(51) Int. Cl.
*G06F 17/30* (2006.01)

(52) U.S. Cl. ............................. 707/2; 707/206; 707/101

(58) Field of Classification Search ................. 707/206, 707/2, 101, 104.1
See application file for complete search history.

(56) References Cited

U.S. PATENT DOCUMENTS

| | | | |
|---|---|---|---|
| 4,907,151 | A | 3/1990 | Bartlett |
| 5,088,036 | A | 2/1992 | Ellis et al. |
| 5,321,834 | A | 6/1994 | Weiser et al. |
| 5,590,332 | A | 12/1996 | Baker |
| 5,652,883 | A | 7/1997 | Adcock |
| 5,687,368 | A | 11/1997 | Nilsen |
| 5,900,001 | A | 5/1999 | Wolczko et al. |
| 5,903,900 | A | 5/1999 | Knippel et al. |
| 5,946,492 | A | 8/1999 | Bates |
| 5,999,732 | A | 12/1999 | Bak et al. |
| 6,049,810 | A | 4/2000 | Schwartz et al. |
| 6,065,020 | A | 5/2000 | Dussud |
| 6,093,216 | A | 7/2000 | Adl-Tabatabai et al. |
| 6,098,089 | A | 8/2000 | O'Conner et al. |
| 6,101,580 | A | 8/2000 | Agesen et al. |
| 6,105,041 | A | 8/2000 | Bennett et al. |
| 6,115,782 | A | 9/2000 | Wolczko et al. |
| 6,125,434 | A | 9/2000 | Willard et al. |
| 6,173,294 | B1 | 1/2001 | Azagury et al. |
| 6,226,653 | B1 | 5/2001 | Alpern et al. |
| 6,253,215 | B1 | 6/2001 | Agesen et al. |
| 6,289,360 | B1 | 9/2001 | Kolodner et al. |

(Continued)

OTHER PUBLICATIONS

L. Amsaleg, et al., Garbage Collection for a Client-Server Persistent Object Store, ACM Transactions on Computer Systems, Aug. 1999, pp. 153-201, vol. 17 No. 3.

(Continued)

*Primary Examiner*—Yicun Wu
(74) *Attorney, Agent, or Firm*—Amin, Turocy & Calvin, LLP

(57) ABSTRACT

A system and method is provided for efficiently pinning references to the managed heap. The system and method allow for references to managed objects to be declared as pinned during a call to unmanaged code. The references are then reported as pinned to a garbage collector in response to invocation of a garbage collection service. The reference can be declared as pinned by a programmer within the source code or automatically invoked at run-time based on an unsafe condition. The garbage collection service will not move or relocate objects that are referenced by the active pinned local variables. If a garbage collection does not occur, the fact that the local variables are declared pinned is ignored.

28 Claims, 9 Drawing Sheets

U.S. PATENT DOCUMENTS

| | | | |
|---|---|---|---|
| 6,317,756 | B1 | 11/2001 | Kolodner et al. |
| 6,341,293 | B1 | 1/2002 | Hennessey |
| 6,381,738 | B1 | 4/2002 | Choi et al. |
| 6,421,689 | B1 | 7/2002 | Benson et al. |
| 6,434,575 | B1 | 8/2002 | Berry et al. |
| 6,446,257 | B1 | 9/2002 | Pradhan et al. |
| 6,470,361 | B1 | 10/2002 | Alpern et al. |
| 6,473,773 | B1 | 10/2002 | Cheng et al. |
| 6,484,188 | B1 * | 11/2002 | Kwong et al. ............... 707/206 |
| 6,490,599 | B2 | 12/2002 | Kolodner et al. |
| 6,502,111 | B1 | 12/2002 | Dussud |
| 6,510,440 | B1 | 1/2003 | Alpern et al. |
| 6,820,101 | B2 | 11/2004 | Wallman |
| 6,865,657 | B1 | 3/2005 | Traversat et al. |

OTHER PUBLICATIONS

S. Abdullahi, et al., Garbage Collecting the Internet: A Survey of Distributed Garbage Collection, ACM Computing Surveys, Sep. 1998, pp. 330-373, vol. 30 No. 3.

R. L. Hudson, et al., Cycles to Recycle: Garbage Collection on the IA-64, Sigplan Notices, Jan. 2001, pp. 101-110, vol. 36 No. 1.

T. Domani, et al., Implementing an On-The-Fly Garbage Collector for Java, Sigplan Notices, Jan. 2001, pp. 155-166, vol. 36 No. 1.

G. Rodriguez-Rivera, et al., Conservative Garbage Collection for General Memory Allocators, Sigplan Notices, Jan. 2001, pp. 71-79, vol. 36 No. 1.

M. Rezaei, et al., A New Implementation Technique for Memory Management, Proceedings of IEEE SoutheastCon 2000. 'Preparing for The New Millenium', 2000, pp. 332-339.

J. Richter, Garbage Collection: Automatic Memory Management in the Microsoft .NET Framework, MSDN Magazine, http://msdn.microsoft.com/library/periodic/period00/qci.htm, Viewed Jan. 2001, 12 pg.

Fred Brown, Incremental Garbage Collection in Massive Object Stores, Proceedings of the 24th Ausralasian Conference on Computer Science, 2001, pp. 38-46.

Henning Makholm, A Region-based Memory Manager for Prolog, Proceedings of the International Symposium on Memory Management, 2001, pp. 25-34.

Tony Printezis and David Detlefs, A Generational Mostly-concurrent Garbage Collector, Proceedings of the International Symposium on Memory Management, 2001, pp. 143-154.

* cited by examiner

DECLARATIVE PINNING

CROSS REFERENCE TO RELATED APPLICATIONS

This application is a divisional application of U.S. patent application Ser. No. 09/873,803 filed Jun. 4, 2001 now U.S. Pat. No. 6,898,611, entitled DECLARATIVE PINNING, which is a continuation-in-part (CIP) application of U.S. patent application Ser. No. 09/803,240 filed Mar. 8, 2001 now U.S. Pat. No. 6,598,141, entitled MANIPULATING INTERIOR POINTERS ON A STACK. The entireties of these applications are incorporated herein by reference.

TECHNICAL FIELD

The present invention relates to the management of memory in computer systems, and more particularly to a system and method for automatic management of memory employing a garbage collector.

BACKGROUND OF THE INVENTION

Memory available for task execution is one of the most important resources in a computer system. Therefore, much time and energy has been directed to efficient utilization and management of memory. An important aspect of memory management is the manner in which memory is allocated to a task, deallocated and then reclaimed for use by other tasks. The process that dynamically manages the memory is referred to as the memory manager. The memory that the memory manager manages is referred to as the heap. When a program needs a block of memory to store data, the resource sends a request to the memory manager for memory. The memory manager then allocates a block of memory in the heap to satisfy the request and sends a reference (e.g., a pointer) to the block of memory to the program. The program can then access the block of memory through the reference.

Memory allocation and deallocation techniques have become very important in structured programming and object oriented programming languages. Memory allocated from a heap can be used to store information. Often this information is an instantiated object within an objected oriented paradigm. Conventionally, many programming languages have placed the responsibility for dynamic allocations and deallocation of memory on the programmer. These programming language types are referred to as unmanaged or unsafe programming languages, because pointers can be employed anywhere in an object or routine. In C, C++ and the Pascal programming languages, memory is allocated from the heap by a call procedure, which passes a pointer to the allocated memory back to the call procedure. A call to free the memory is then available to deallocate the memory. However, if a program overwrites a pointer, then the corresponding heap segment becomes inaccessible to the program. An allocated heap segment may be pointed to by several pointers, located on the stack or in another allocated heap segment. When all the pointers become overwritten, the heap segment becomes inaccessible. A program cannot retrieve from or write data to an inaccessible heap segment. These inaccessible heap segments are known as memory leaks.

Furthermore, dynamically allocated storage may become unreachable if no reference, or pointer to the storage remains in the set of root reference locations for a given computation. The "root set" is a set of node references such that the referenced node must be retained regardless of the state of the heap. A node is a memory segment allocated from the heap. Nodes are accessed through pointers. A node is reachable if the node is in the root set or referenced by a reachable node. Similarly, storage associated with a memory object can be deallocated while still referenced. In this case, a dangling reference has been created. In most programming languages, heap allocations are required for data structures that survive the procedure that created them. If these data structures are passed to further procedures or functions, it may be difficult or impossible for the programmer or compiler to determine the point at which it is safe to deallocate them. Memory objects that are no longer reachable, but have not been freed are called garbage.

Due to the above difficulties with reclamation of heap-allocated storage, automatic reclamation is an attractive alternative for dynamic memory management. The automatic identification and reclaiming of inaccessible heap segments is known as garbage collection. Garbage collection methodologies determine when a memory segment is no longer reachable by an executing program either directly or through a chain of pointers. When a memory segment is no longer reachable, the memory segment can be reclaimed and reused even if it has not been explicitly deallocated by the program. Garbage collection is particularly attractive to managed or functional languages (e.g., JAVA, Prolog, Lisp Smalltalk, Scheme). In some circumstances, managed data structures need to be passed to unmanaged code (e.g., a file read API provided by the operating system). In these situations, the unmanaged code is unaware of the managed constraints. Therefore, there must be some mechanism in place to assure that the managed data structures are not moved by the garbage collector, while unmanaged code is manipulating memory managed by the garbage collector.

One conventional mechanism consists of copying the managed data structure into an unmanaged unmoveable memory. The call to unmanaged code is made and then the unmanaged memory is copied back into the managed data structure. This mechanism is inefficient due to the constant copying back and forth of the managed data structure. Another mechanism is that the garbage collector is prevented from running while the unmanaged call is in progress. This mechanism does not work well in multithreaded environments. Another conventional mechanism is to allocate unmoveable managed objects with a special API. However, the creation of these objects is generally slower than other managed objects and is also difficult for the developer to know which objects will be passed to an unmanaged API.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A system and method is provided for efficiently pinning references to the managed heap. The system and method allow for references (e.g., local variables) to managed objects to be declared as pinned in unmanaged code during a call to the unmanaged code. The references are then reported as pinned to a garbage collector in response to invocation of a garbage collection service. The garbage collection service will not move or relocate objects that are referenced by active pinned references. If a garbage collection does not occur, the fact that the references are pinned is ignored. The reference can be declared as pinned by a programmer within the source code or automatically invoked at run-time in response to an unsafe condition.

In one aspect of the invention, code is executed by an execution engine (e.g., compiler or interpreter) and references (e.g., object references and interior references) are stored in an execution stack. The code may be precompiled, compiled in real-time or interpreted. During execution of a call, local variables on the stack reference objects residing in a managed heap. Dynamic memory management (e.g., a garbage collection service) is employed periodically to cleanup dead or unused objects from the stack and/or a heap containing globally shared objects or the like. Local variables that point to managed memory can be declared as being pinned. This declaration does not change the instructions that will execute, but does indicate that any object pointed to by this variable cannot move as long as the variable exists. Any structures pointed to by such pinned variables can be safely passed as parameters to unmanaged code.

For example, when a reference to a managed object is passed to an unmanaged call, the object is pinned by having a local variable within the unmanaged code declared to be pinned point to the managed object. If a garbage collection occurs during invocation of unmanaged code, the execution engine or a code manager passes the local variables to the garbage collector as being pinned. The garbage collection service will not move or relocate objects that are referenced by the active pinned local variables. If a garbage collection does not occur, the fact that the local variables are pinned is ignored.

A system and method is provided for executing both managed and unmanaged code in a managed environment and managing memory employing a garbage collection system or service. Managed code is code that manipulates objects that were allocated in the heap. Managed code is required to have a mechanism for enumerating all the live garbage collector pointers currently in use. Unmanaged code is code that does not manipulate garbage collector pointers and does not need to have a garbage collector enumeration mechanism. The code may be precompiled, compiled in real-time or interpreted. Managed code includes information about which local variables point at the managed heap and whether they should be pinned or not. During execution the local variables are stored on a stack. Upon a call to unmanaged code, references pointing to managed objects can be programmatically or automatically declared pinned by a programmer, by an execution engine, a compiler or the like.

For example, local variables of methods of unmanaged code referencing managed objects are declared pinned prior to a garbage collection. The pinned references are then stored on the stack. The system and method identify roots including object references, interior references and pinned references on a stack. The references are reported to a garbage collection system or service. The garbage collection system or service employs the references when tracing the heap for objects and data members (e.g., integer numbers, floating values, character fields, other objects) within the objects. Memory that is inaccessible is then reclaimed for assignment to other objects. Objects referred to by pinned references are fixed in their current location during any garbage collection.

In one aspect of the invention, a system and method is provided for pinning local variables of unmanaged code referencing managed objects during execution of code in a run-time environment. Upon invocation of a garbage collection service, the local variables are passed to the garbage collections service as pinned. Objects referenced by pinned local variables are then fixed during reclamation of inaccessible memory segments.

In another aspect of the present invention, native code is generated by a compiler (e.g., Just-In-Time compiler) and object references and interior references are stored in a process stack. The code can include both managed and unmanaged code. The interior references (e.g., references within an object) are created and stored on the stack by calls within the code. For example, a call to modify a field or data member within an object may be made within the code. In response, the compiler creates an interior reference, which is stored in the process stack. A reference can be declared pinned by the compiler and stored in the stack. A reference can be declared pinned if the compiler decides it is unsafe to move objects referenced by the pinned reference during execution of a call. A code manager then scans the stack and passes the object references, interior references and the pinned references to a garbage collector. The garbage collector then employs the object references, the interior references and pinned references to trace the heap, remove inaccessible objects, and move accessible objects not referenced by pinned references.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention is now described with reference to the drawings. General purpose programming languages and other programmed systems often use references to locate and access objects. These objects can contain references to data members, such as integers, floating point numbers, character fields or other objects. These objects can be either managed or unmanaged. During execution of unmanaged code, managed data structures can be used. The present invention declares references to managed objects or data structures as pinned during execution of unmanaged calls. The present invention is described with reference to a system and method for efficiently pinning references to a managed heap. The system and method allow for references (e.g., local variables) to managed objects to be declared as pinned during unsafe conditions (e.g., a call to unmanaged code that manipulates managed data). Upon invocation of a garbage collection, the references and pinned references are passed to a garbage collection system or service. The garbage collection system or service employs both the references and pinned references when tracing the heap for objects. Objects that are inaccessible are then reclaimed for assignment to other objects. However, objects referenced by pinned references are not moved during reclaiming of memory.

In one aspect of the invention, some arguments or local variables are declared to be pinned in the source code. In another aspect of the invention, some arguments or local variables are declared pinned automatically by an execution engine or the like. The pinned references are only allowed on the stack and not in the heap. The references are pinned for the lifetime of the local variable on the stack. For example, when a pointer to a managed object is passed to an unmanaged call, the object is pinned by having a local variable declared to be pinned point to it. If a garbage collection occurs, this local variable is reported to the garbage collector as being pinned. The garbage collection system or service may be invoked periodically by an operating system, a memory manager or some other service. Alternatively, the garbage collection system can be invoked in response to a request for memory by an executing program. The garbage collections system can also be invoked when the heap becomes full.

Figure 1:
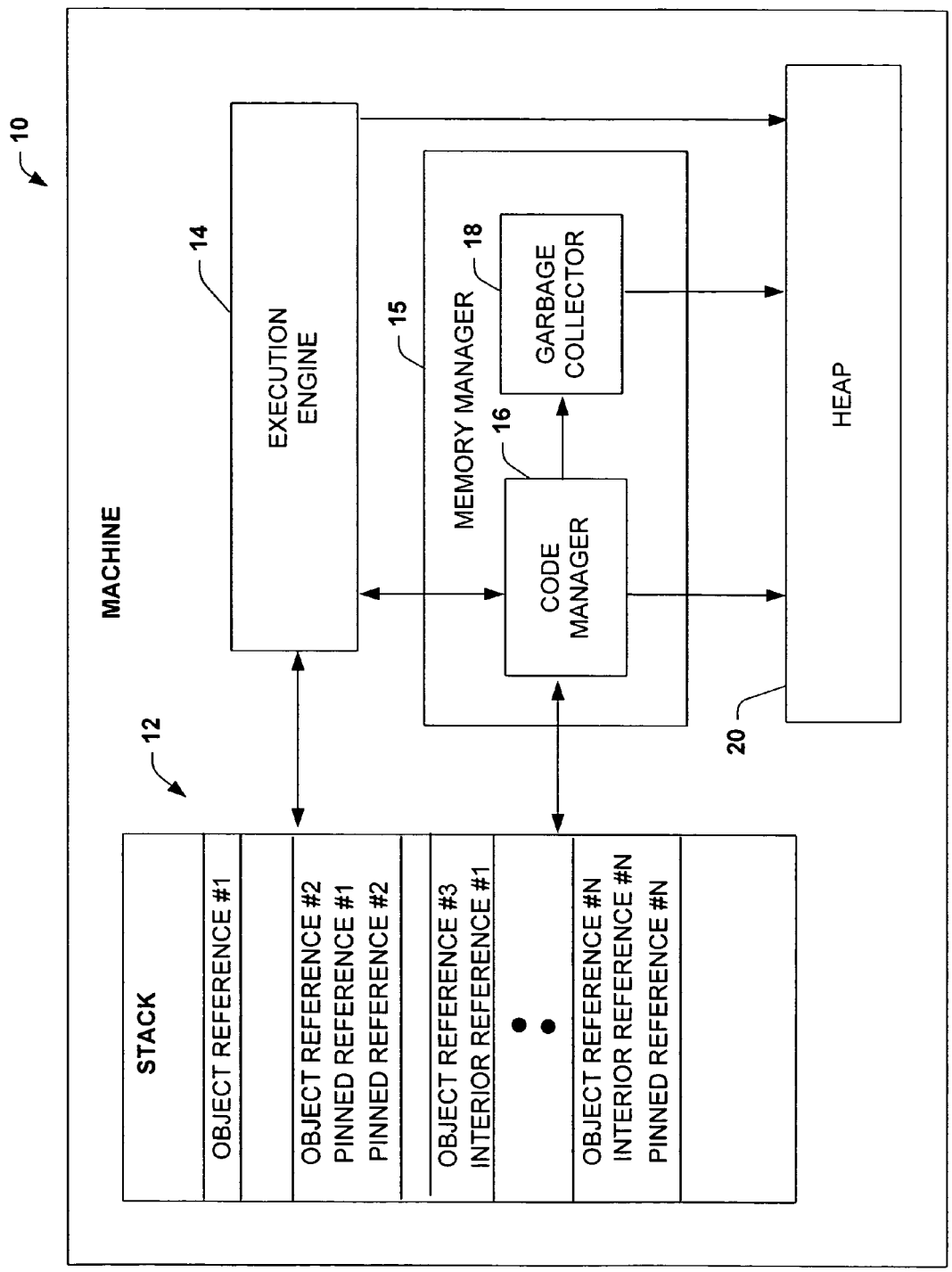
FIG. 1 illustrates a block diagram of a machine having a memory manager system in accordance with one aspect of the present invention.

FIG. 1 illustrates an example of a machine 10 including a process stack 12, an execution engine 14, a memory manager 15, and a memory heap 20. The memory manager includes a code manager 16 and a garbage collector 18. During execution of one or more programs or processes on a machine, status information about executing programs are stored on the process stack 12, so that programs can call one another. When one program calls another program, status information about the calling program is stored on the stack 12, so that the calling program can resume its processing after the called program returns control of the processor to the calling program. The status information also includes processor register values of the process at the time the process relinquished control of the processor, object and variable declaration and calls and intermediate computational quantities, such as object references and interior references to the objects referenced.

In the example of FIG. 1, the stack 12 includes, amongst other items, a number object references (e.g., pointers) that reference the location of a corresponding object in the memory heap 16. The objects can be grouped into frames (not shown). Each frame corresponds to one level of subroutine invocation or method invocation. The stack 12 also includes a number of interior references (e.g., pointers) that reference the location of data members (e.g., integer numbers, floating values, character fields, other objects) within the various objects. Since any number of programs may call the same objects and/or object data members, multiple references or interior references to an object can reside in the process stack 12. The object reference can also be located in another heap segment of the memory heap 20. The interior reference locations can be limited to residing on the stack.

The execution engine 14 runs both managed and unmanaged code. Managed code is code reports its garbage collection heap references, while unmanaged code does not report its heap references and does not employ garbage collection. When a program needs memory to store data, the execution engine 14 allocates an object in the garbage collection heap 20 to satisfy the request. The execution engine 14 then sends a reference to the object to the program. The program can then access the object through the reference. The execution engine 14 declares references (e.g., local variables) to managed data structures or objects as being pinned during unsafe conditions (e.g., a call to unmanaged code that manipulates managed data). Additionally, references can be declared as pinned in the source code to allow for fine grain control by the programmer. Declaring references pinned has no effect on the functionality of the system 10, unless a garbage collection occurs.

The execution engine 14 will invoke or receive an invocation to perform a garbage collection algorithm. Alternatively, the invocation can be a result of a request for memory by a program. Upon invocation of the garbage collection algorithm, the execution engine 14 will report certain references as pinned, to assure the integrity of the program. For example, local variables can be declared to be pinned, which indicates that the object they point to will not move over the lifetime of the local variable. Thus, the object being pointed to by the local variable can be passed to a call to unmanaged code. The execution engine 14 will then invoke the code manager 16, which will scan or decode the stack 12 for the roots on the stack (e.g., object references, interior references, pinned object references and pinned interior references). The code manager 16 then transmits the roots to the garbage collection system 18.

Although the code manager 16 is illustrated as a separate component from the garbage collection system 18 within the memory manager system 15, it is to be appreciated that the code manager 16 can be integrated into the garbage collection system 18. The garbage collection system will then trace through the memory heap 20 to determine accessible objects using the transmitted references. The garbage collector 18 will perform a clean up of the memory heap 20, which comprises moving objects that are traceable and removing objects that are not traceable. However, the garbage collector 18 will not move objects that are referenced by pinned references. Every program or application executing on the machine 10 has a set of roots. Roots identify storage locations, which refer to objects on the managed heap. All of the global and static object pointers in a program are considered part of the program's roots. In addition, any local variable/parameter object pointers on a thread's stack are considered part of the program's roots. Furthermore, any CPU registers containing pointers to objects in the managed heap are also considered part of the program's roots.

Figure 2:
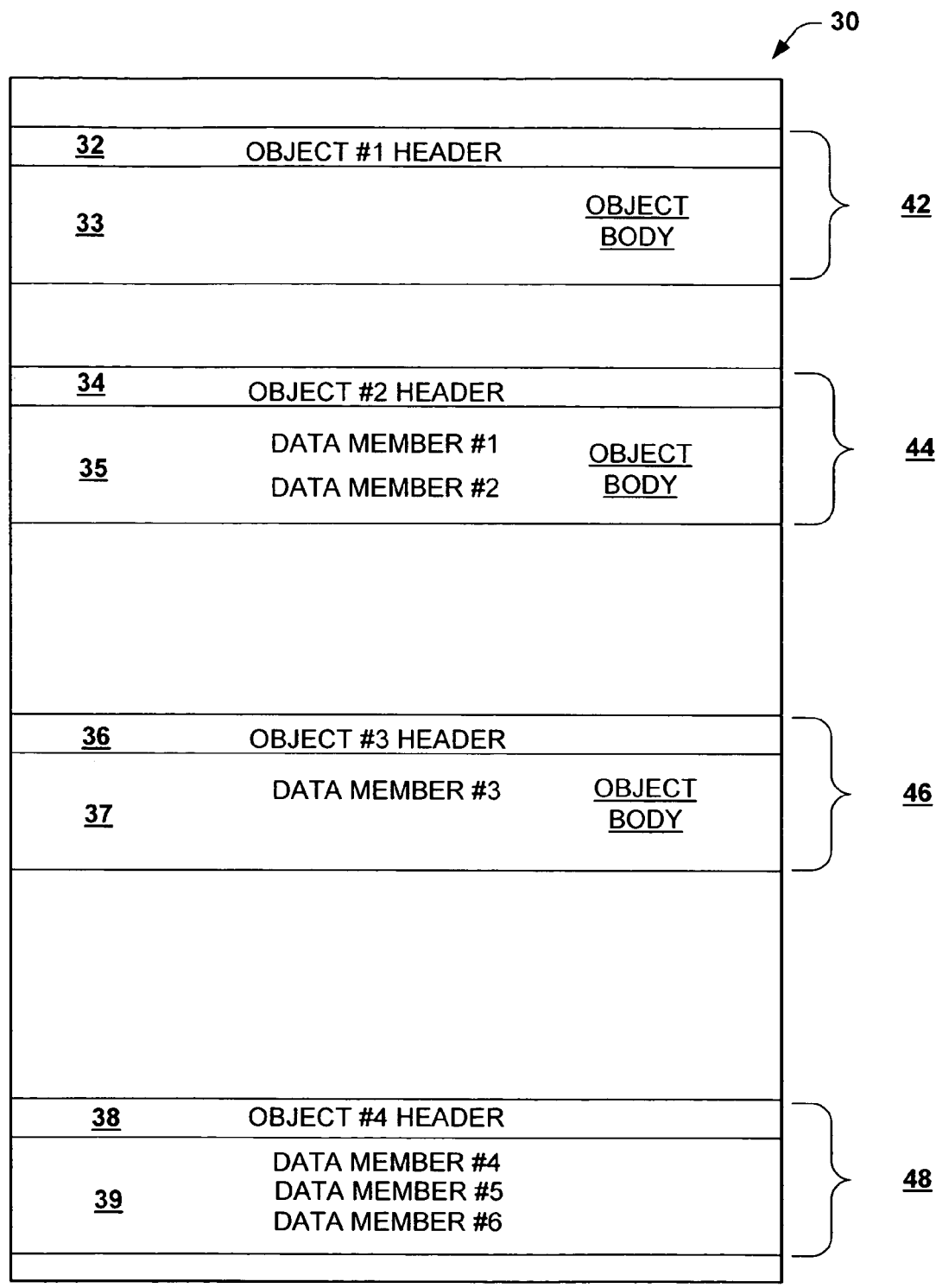
FIG. 2 illustrates a block diagram of a memory heap in accordance with one aspect of the invention.

FIG. 2 illustrates a block diagram of the contents of a memory heap 30. A plurality of objects reside in the memory heap 30. Each object includes a header and a body. The contents of the object headers are controlled by the operating system and are generally not accessible to users and application programs. The object header contains or refers to information that supports the instantiated object. The information in the object header often includes a pointer to a class definition, a methods table and an instance-variable count. The object references provide information on the locations of the object header. The object body is the part of the object that is visible to application programs and includes the variables and various fields used by the application programs. A first object 42 includes an object header 32 and an object body 33. A second object 44 includes an object header 34 and an object body 35. The object body 35 includes a first and a second data member. The data members can be integers, floating point numbers, character fields, data structures or pointers to other objects. In the present invention, object references can be found in the stack that reference the object headers, while interior references can be found in the stack that reference the data members within the object body. A third object 46 includes an object header 36 and an object body 37. The object body 37 includes a third data member. A fourth object 48 includes an object header 38 and an object body 39. The object body 39 includes a fourth, a fifth and a sixth data member.

As previously stated, the garbage collection system 18 will trace through the memory heap or walk the roots utilizing the object references and interior references to determine if objects referenced by the references are accessible. The garbage collector will build a graph of all object references reachable from the roots.

For example, if the garbage collection system 18 traces object reference #1 to the first object 42 in the heap 30, the garbage collection system will add the first object 42 to the graph. Additionally, if the garbage collection system notices that the first object 42 refers to the second object 44, then second object 44 is added to the graph. The garbage collection system continues to walk through all reachable objects recursively. If a reference is pinned, the object referred to by the pinned reference is added to the graph, but noted as pinned. The garbage collection system then reclaims inaccessible memory segments by moving the objects to the front of the heap that have been located, except for the objects referred to by pinned references. In none of the references are pinned, the garbage collection system moves all of the objects up in the heap.

Figure 3:
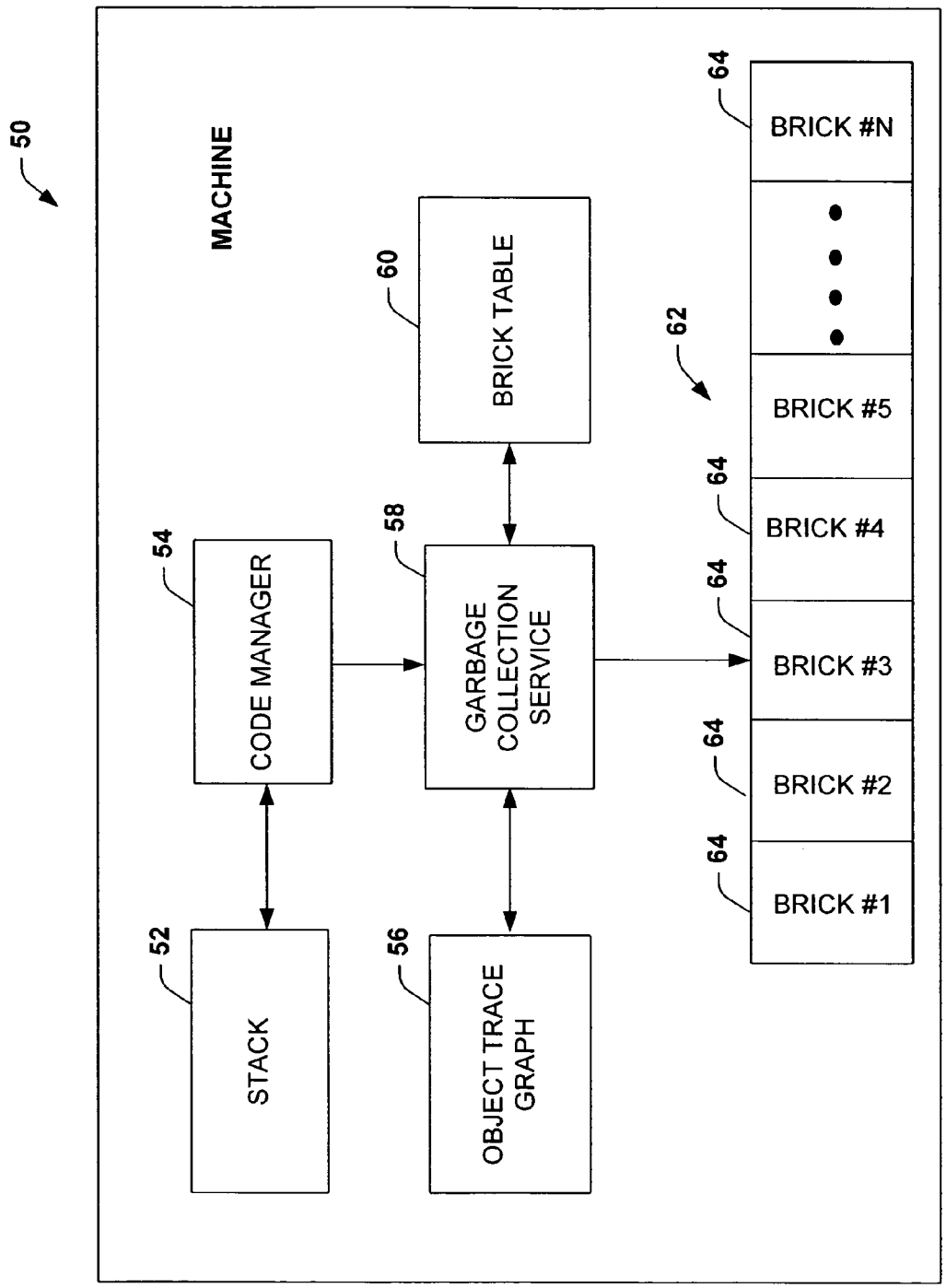
FIG. 3 illustrates a block diagram of a machine having components for tracing references in accordance with one aspect of the present invention.

For example, as illustrated in FIG. 3, a machine 50 is provided that includes a stack 52, a code manager 54, a garbage collection service 58 and a heap 62. The heap 62 is logically divided into equal sized bricks 64 (e.g., 2 KB) and a brick table 60 is set up to contain for each brick, the address of an object within that brick. The code manager 54 decodes the stack 52 for references (e.g., object references and interior references) and pinned references (e.g., pinned object references and pinned interior references). The references and pinned references are transmitted to the garbage collection services 58. The garbage collection service 58 traces the object references and its descendants and marks them in an object trace graph 56. If the reference is pinned, the garbage collection system notes this in the object trace graph.

As the garbage collection service 58 walks through objects and data members, an attempt to add an object to the graph that was previously added will result in the garbage collection service 58 aborting walking down that path. This serves the purpose of significantly improving performance since the garbage collection service 58 doesn't walk through a set of objects more than once. Also, it prevents infinite loops if any circular linked lists of objects exist. Once all roots have been checked, the object trace graph 56 contains all the sets of all objects that are somehow reachable from the program's roots. The garbage collection service 58 then can shift the non-garbage objects down in memory removing all the gaps in the heap 62, except for any object that is referenced by an element type pinned will remain in its original location so that managed data structures will not be moved during an execution call, for example, to unmanaged code. The garbage collection service 58 then modifies the programs roots so that the references point to the objects new locations. The garbage collection service 58 also modifies any references to objects within objects. Pinned references do not need updating since the garbage collector guarantees that the object these references point to have not been moved.

Figure 4:
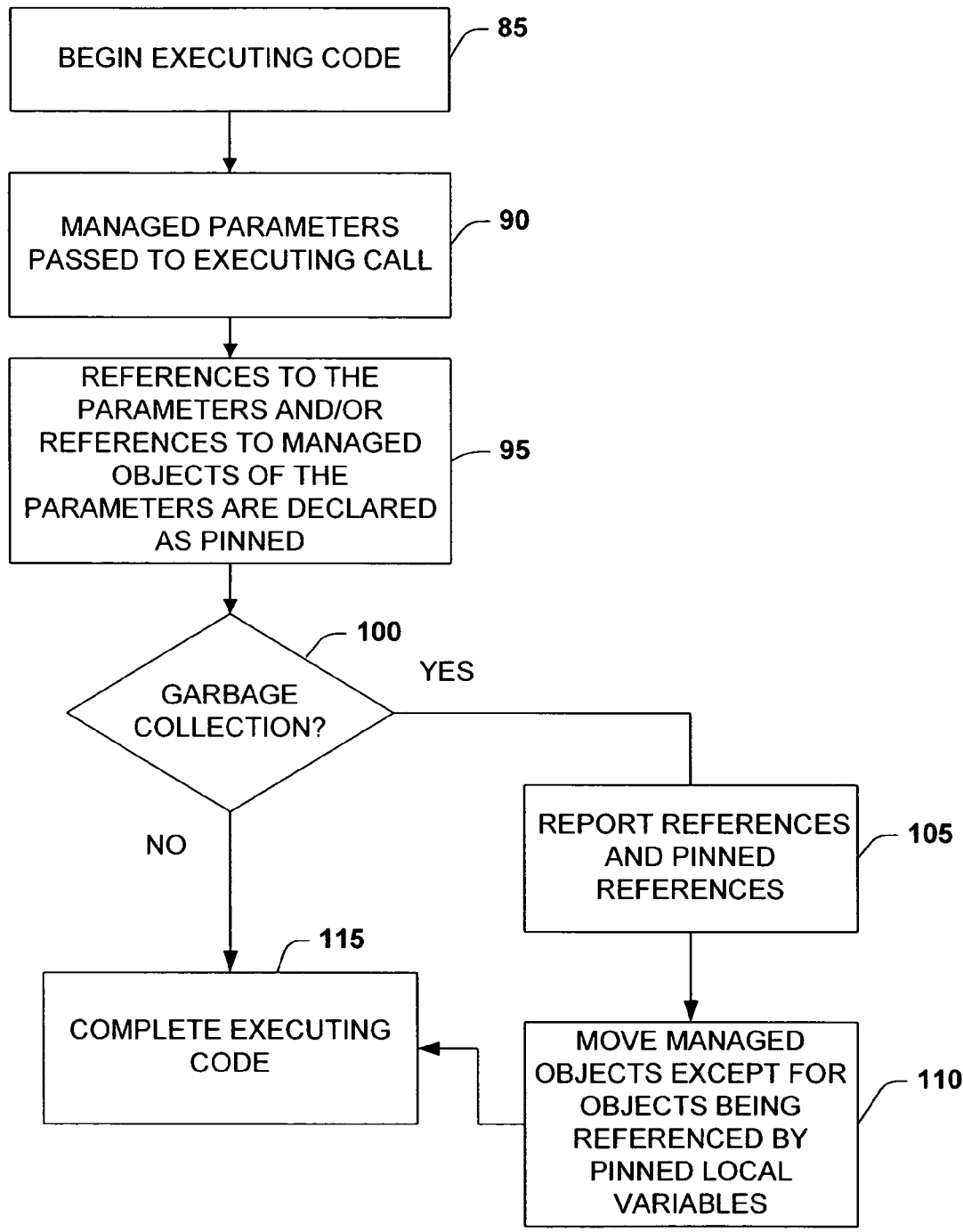
FIG. 4 illustrates a flow diagram of a methodology of declaring references as pinned prior to invocation of a garbage collection service in accordance with one aspect of the present invention.
Figure 5:
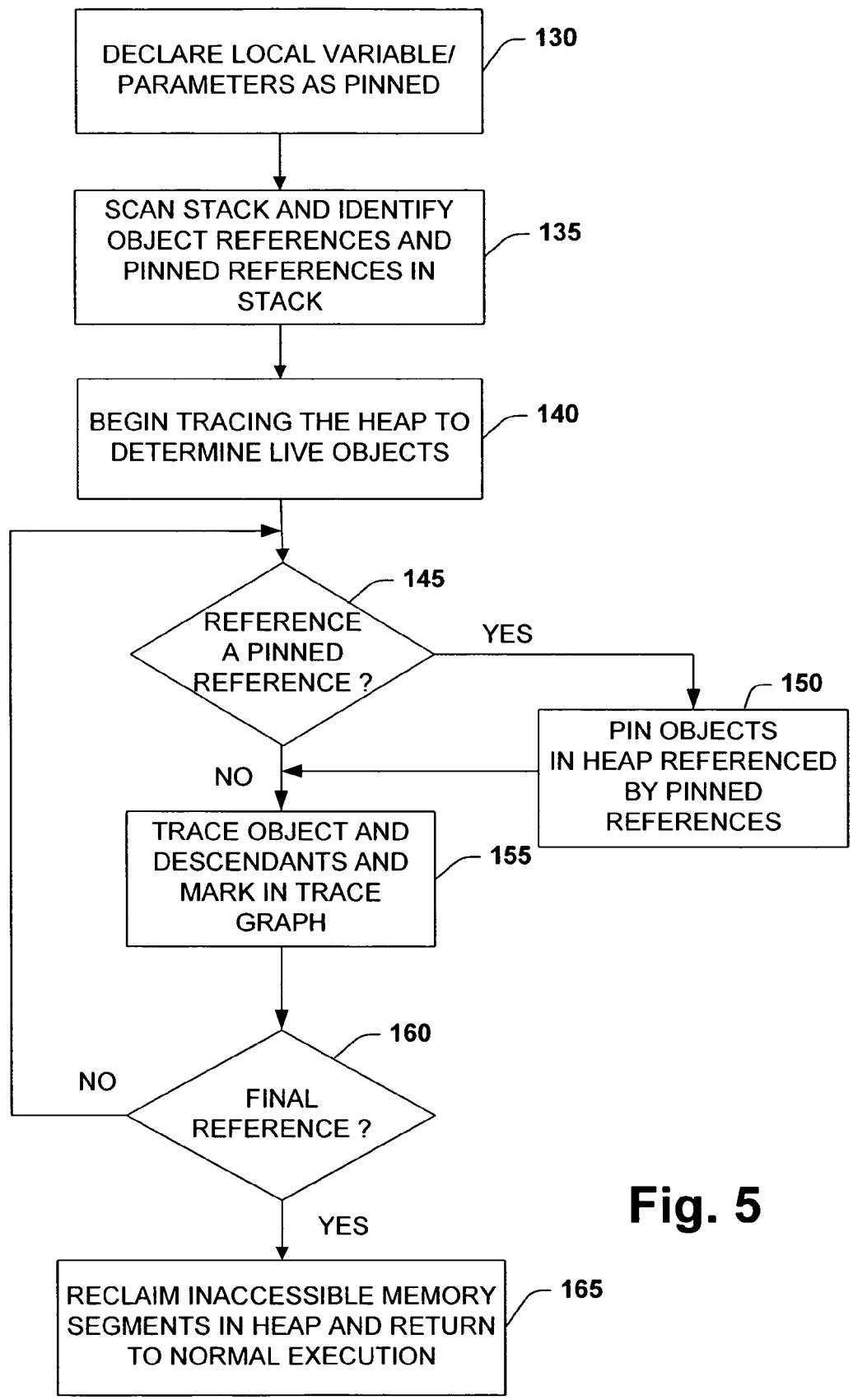
FIG. 5 illustrates a flow diagram of a methodology of reclaiming inaccessible memory segments in a heap in accordance with one aspect of the present invention.

In view of the foregoing structural and functional features described above, a methodology in accordance with various aspects of the present invention will be better appreciated with reference to FIGS. 4-5. While, for purposes of simplicity of explanation, the methodology of FIGS. 4-5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 4 illustrates one particular methodology for declaring references as pinned prior to invocation of a garbage collection service in accordance with the present invention. The methodology begins at 85 where code begins executing by an execution engine, a compiler or the like. At 90, managed parameters are passed to an executing call (e.g., unmanaged code). Some of these passed parameters may have been declared pinned in the source code. At 95, references to the parameters and or references to the managed objects of the parameters are declared as pinned. At 100, it is determined if a garbage collection service is invoked. If a garbage collection service is not invoked during execution of the call (NO), the call proceeds normally and completes executing at 115. If a garbage collection service is invoked during execution of the call (YES), the method proceeds to 105. At 105, the code manager or execution engine reports references on the stack, indicating which references are pinned. The method then proceeds to 110 where the garbage collection service traces the heap and moves managed objects except for objects being referenced by pinned local variables/parameters. The method then advances to 115 and completes executing.

FIG. 5 illustrates a methodology for reclaiming inaccessible memory segments in a memory heap in accordance with the present invention. The methodology begins at 130 where local variables/parameters residing in unmanaged code referencing managed data structures or objects are declared as pinned. The methodology then proceeds to 135 where a garbage collection service is invoked. At 135, the process stack is scanned and references and pinned references are identified. The garbage collection service begins tracing the memory heap to determine live objects and live data members at 140. The methodology then proceeds to 145 where the garbage collection service retrieves a reference and determines if a reference is a pinned reference. If the reference is not a pinned reference (NO), the methodology proceeds to 155. If the reference is a pinned reference (YES), the methodology proceeds to 150. At 150, the garbage collector pins objects in the heap referenced by pinned local variables/parameters. The methodology then proceeds to 155.

At 155, the garbage collection system traces the object and its descendants. If the object is found it is added to a trace graph and any references (e.g., descendants) found that were called out within that object are also added to the trace graph. At 160, the methodology determines if the reference is a final reference. If the reference is not a final reference (NO), the garbage collection system returns to 145 to get another reference and determine if that reference is a pinned reference. If the reference is a final reference (YES), the methodology proceeds to 165. At 165, the garbage collection system reclaims inaccessible memory segments in the heap by moving objects except for pinned objects and then returns control of the operations back to normal execution.

Figure 6:
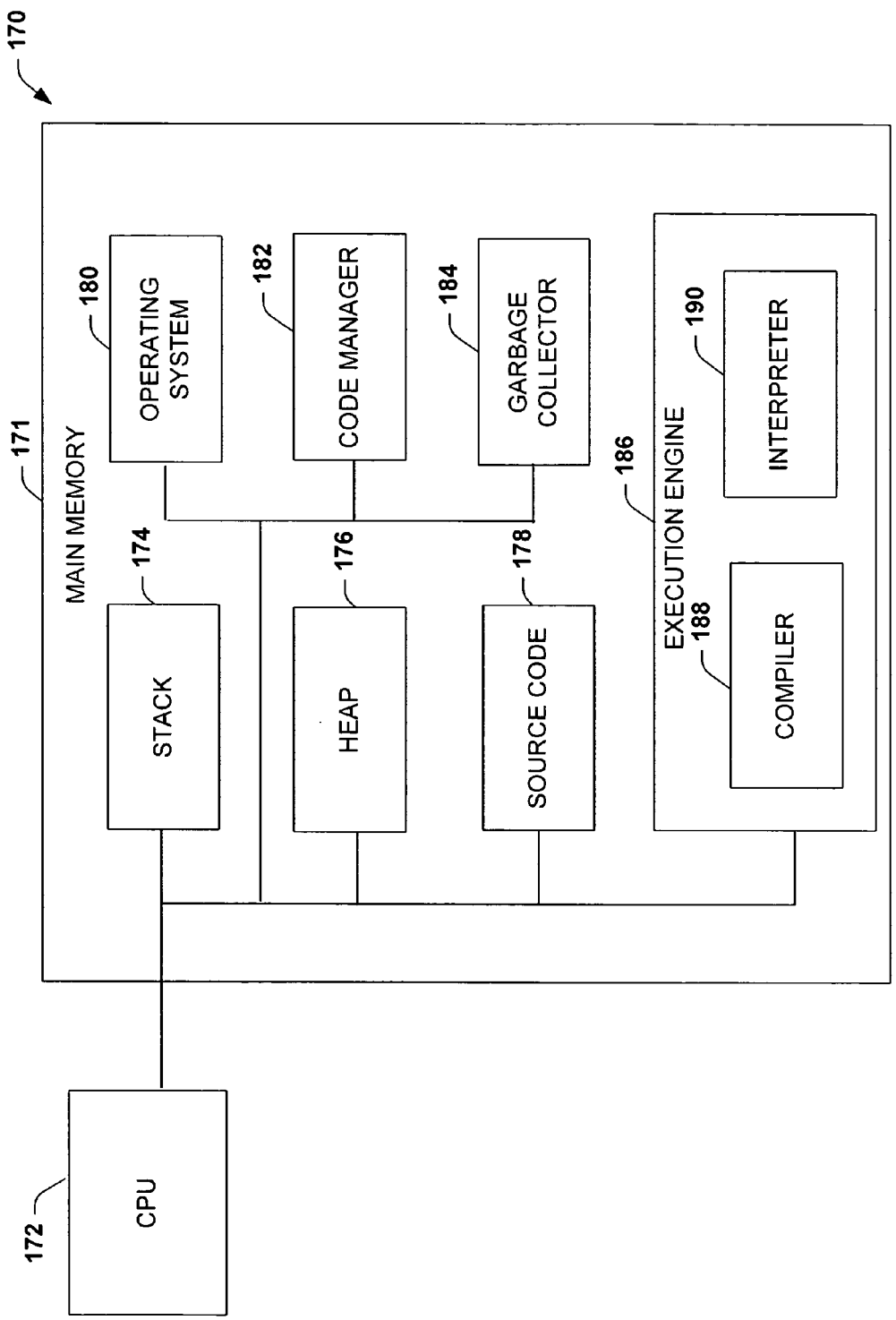
FIG. 6 illustrates a block diagram of components of a system in accordance with one aspect of the present invention.

FIG. 6 illustrates a block diagram of a system 170 in accordance with another aspect of the present invention. The system 170 includes a central processing unit 172 (CPU) and a main memory system 171. The main memory system 171 includes a number of components and programs residing in the main memory system 171. A process stack 174 resides in the main memory 171 for storing program and process states including object references, interior references and pinned references. The main memory system 171 also includes a heap 176 for storing program data such as objects and data members within objects. An operating system 180 resides on the main memory system 171 and provides the mechanism for invoking programs on the system 170. The main memory 171 also includes an execution engine 186 that is used via the CPU 172 to compile or interpret source code 178. The execution engine 186 includes a compiler 188 and an interpreter 190. The source code 178 can be written in any number of languages including both managed code (e.g., JAVA) and unmanaged code (e.g., C, C++). A code manager 182 and a garbage collector 184 also reside in the main memory 171. The code manager 182 performs various functions including managing the execution of the source code, storing metadata regarding the source code and keeping track of object references, interior references and pinned references in the stack 174. The garbage collector 184 is operable to receive these object references, interior references and pinned references from the code manager 182 and reclaim inaccessible memory from the heap 176.

During operation of the system 170, the CPU 172 executes code comprising the operating system 180. Application programs residing as source code 178 can be invoked through the operating system 180. The execution engine 186 reduces the source code 178 to an intermediate form or intermediate language for compiling or interpreting by the compiler 188 and interpreter 190, respectively. Compiled or interpreted code can then be linked with libraries (not shown) or the like, converted to machine code or native code and executed by the CPU 172. During execution, various object references and interior references are stored in the stack 174 and various objects are stored in the heap 176. The execution engine 186 is adapted to execute both managed and unmanaged code. If a call to unmanaged code manipulates managed code, data and/or objects, the local variables referencing the managed structure are marked as pinned or defined as element type pinned. The execution engine 186 informs the code manager 182 of any garbage collection invocation.

The code manager 182 includes a stack decoder service in addition to other services, such as error handling. The code manager 182 is a mechanism for enumerating the garbage collector references that the code is currently manipulating, which almost resides exclusively on the stack. The other place being the machine registers. The code manager 182 then scans the stack and identifies references and pinned references. The code manager 182 then passes these references and pinned references to the garbage collector 184. The garbage collector 184 then employs the references and pinned references in reclaiming inaccessible memory segments in the heap 176, as previously described, and holding objects referenced by pinned references fixed in their current memory location until termination or completion of the call.

Figure 7:
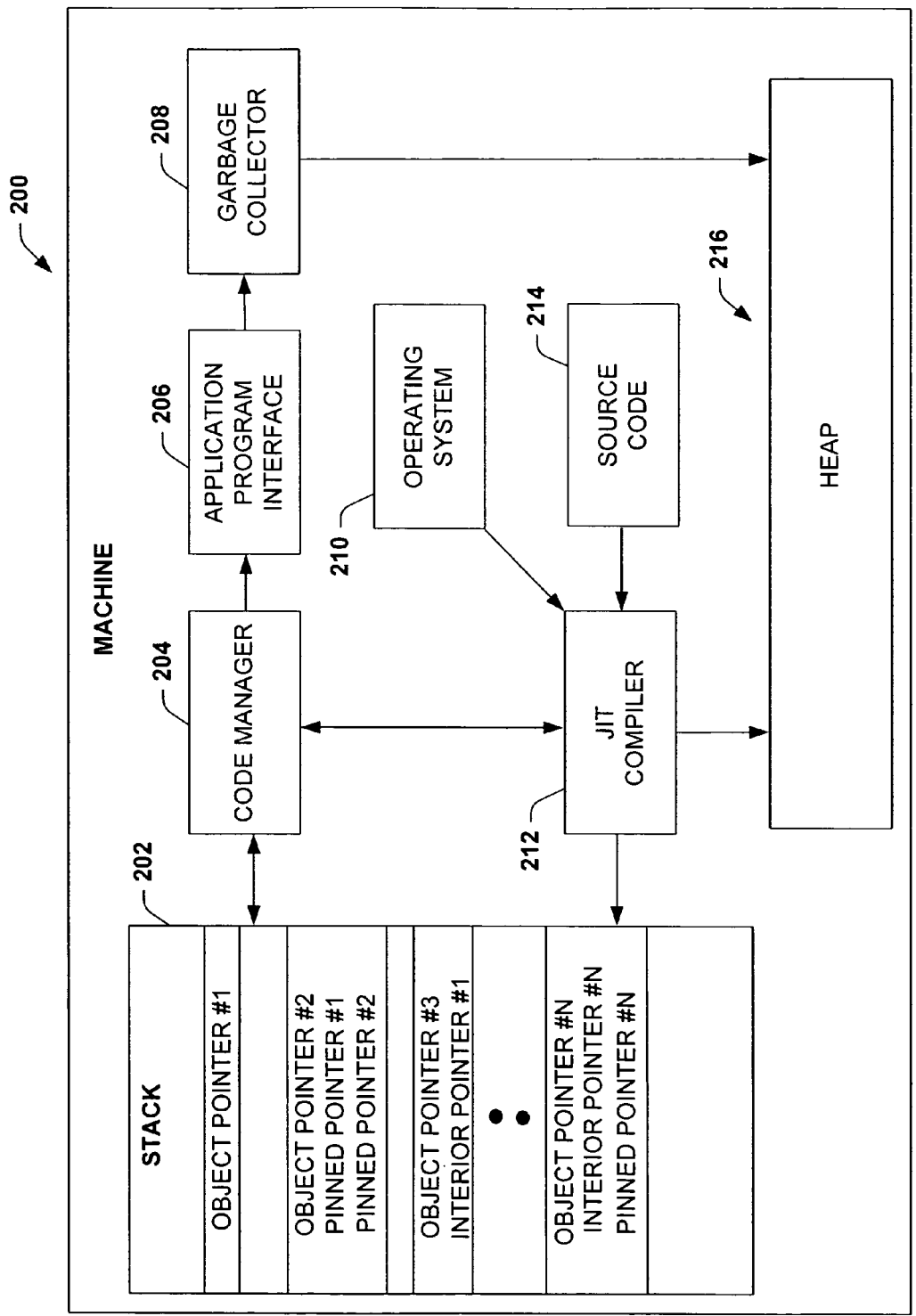
FIG. 7 illustrates a block diagram of various programs and components on a machine in accordance with one aspect of the present invention.

FIG. 7 illustrates a block diagram of the interaction of various programs and components residing on a machine 200. The machine 200 includes an operating system 210 for providing a general environment to the machine 200. The operating system 210 is operable to invoke one or more programs for execution on the machine 200. The operating system 210 invokes a Just-In-Time (JIT) compiler 212 to begin compiling source code 214. The compiler 212 is operable to compile both managed languages and unmanaged languages. For example, the source code can be precompiled in to an intermediate language code prior to compiling by the JIT compiler 212. The JIT compiler can be formed of two compilers, one for managed code and one for unmanaged code. The intermediate language code can then be compiled into object code and the managed code and unmanaged code linked and converted to machine code or native code for execution by the machine 200.

During execution of one or more programs or processes on the machine 200, status information about executing programs are stored on a stack 202, so that programs can call one another. The status information includes both object pointers and interior pointers to data members within the objects referenced. These object pointers and interior pointers can be declared as pinned by the JIT compiler in the event of an unsafe condition. For example, in some situations conversion take place, so that unmanaged and managed code can communicate. In this event, the managed code cannot be moved when managed data is being manipulated. The JIT compiler recognizes this situation and declares a pointer or reference to the managed structure as pinned. During normal execution, the fact that the pointer or reference is pinned is ignored. Upon a garbage collection invocation, the object pointers, interior pointers and pinned object pointers and pinned interior pointers are reported to the garbage collector 208. The garbage collector 208 then holds objects referenced by the pinned pointers as pinned.

In the example of FIG. 7, the stack 202 includes, amongst other items, a number of object pointers that reference the location of a corresponding object in a memory heap 216. The stack 202 also includes a number of interior pointers that reference the location of data members (e.g., integer numbers, floating values, character fields, other objects) within the various objects. The stack 202 also includes a number of pinned pointers that can be either object pointers or interior pointers. Since any number of programs may call the same objects, an object pointer, interior pointer and a pinned pointer can reside in the process stack 202 a number of times. The interior pointers and pinned pointers are limited to residing on the stack 202.

A code manager 204 is provided to dynamically manage the heap memory 216. The code manager includes a stack decoder service in addition to other services, such as error handling. When a program needs a segment of memory to store data, the program sends a request to the code manager 204. The code manager 204 will inform the JIT compiler 212 of the request. The JIT compiler 212 will determine which references should be declared as pinned prior to a garbage collection operation and mark those references or declare those references as pinned when stored in the stack 202. During a garbage collection, the code manager 204 scans the stack 202 for the roots on the stack 202 (e.g., object pointers, interior pointers, pinned pointers). The code manager 204 then reports the roots (e.g., object pointers, interior pointers, pinned pointers) to a garbage collector 208 through an application program interface 206 (API). The garbage collector 208 will then trace through the memory heap 216 to determine inaccessible objects using the object pointers, interior pointers and pinned pointers. The garbage collector 208 then moves the accessible objects, fixes those objects from which the pinned pointers refer and adjusts the pointers accordingly. The JIT compiler 212 then provides the program with a memory segment corresponding to the request.

Figure 8:
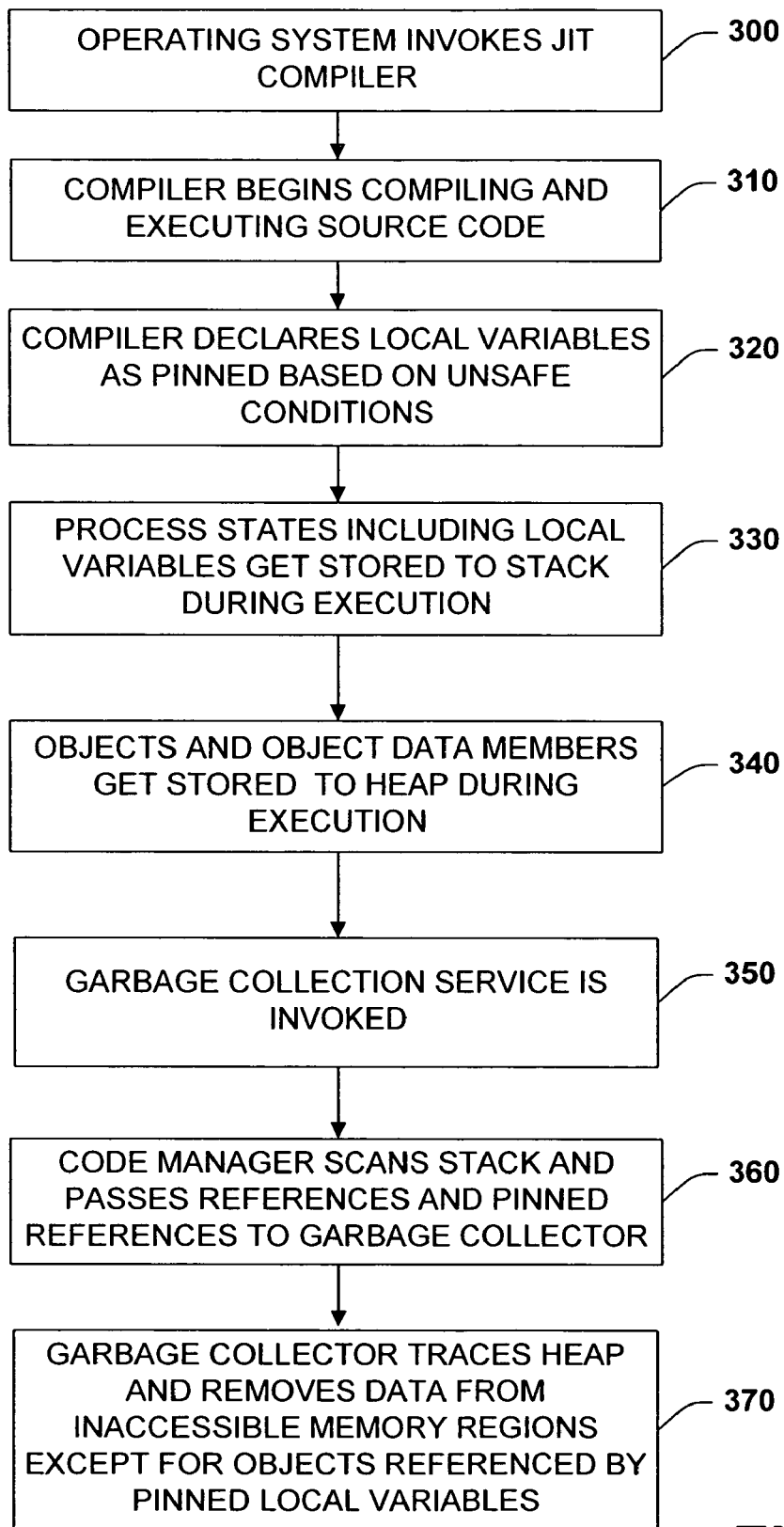
FIG. 8 illustrates a flow diagram of a methodology for executing code by a JIT compiler and reclaiming inaccessible memory segments in a heap in accordance with one aspect of the invention.

In view of the foregoing structural and functional features described above, a methodology in accordance with various aspects of the present invention will be better appreciated with reference to FIG. 8. While, for purposes of simplicity of explanation, the methodology of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. It is further to be appreciated that the following methodology may be implemented as computer-executable instructions, such as software stored in a computer-readable medium. Alternatively, the methodology may be implemented as hardware or a combination of hardware and software.

FIG. 8 illustrates one particular methodology for reclaiming inaccessible memory segment in a heap and assigning a memory segment based on a request from a program in accordance with one aspect of the present invention. The methodology begins at 300 where the operating system invokes the JIT compiler based on a request for running an application program. At 310, the JIT compiler begins compiling source code and the processor begins executing the compiled code. At 320, the compiler declares certain local variables as pinned based on a predefined criteria to prevent an unsafe condition occurring that may result in a failure. At 330, process states including object pointers and interior pointers get stored on the stack during execution. At 340, objects and object data members get stored to the heap during execution. At 350, a garbage collection service is invoked. The code manager scans the stack and passes references and pinned references to the garbage collector at 360. At 370, the garbage collector traces the heap and removes data from inaccessible memory regions, except for objects referenced by pinned local variables.

Figure 9:
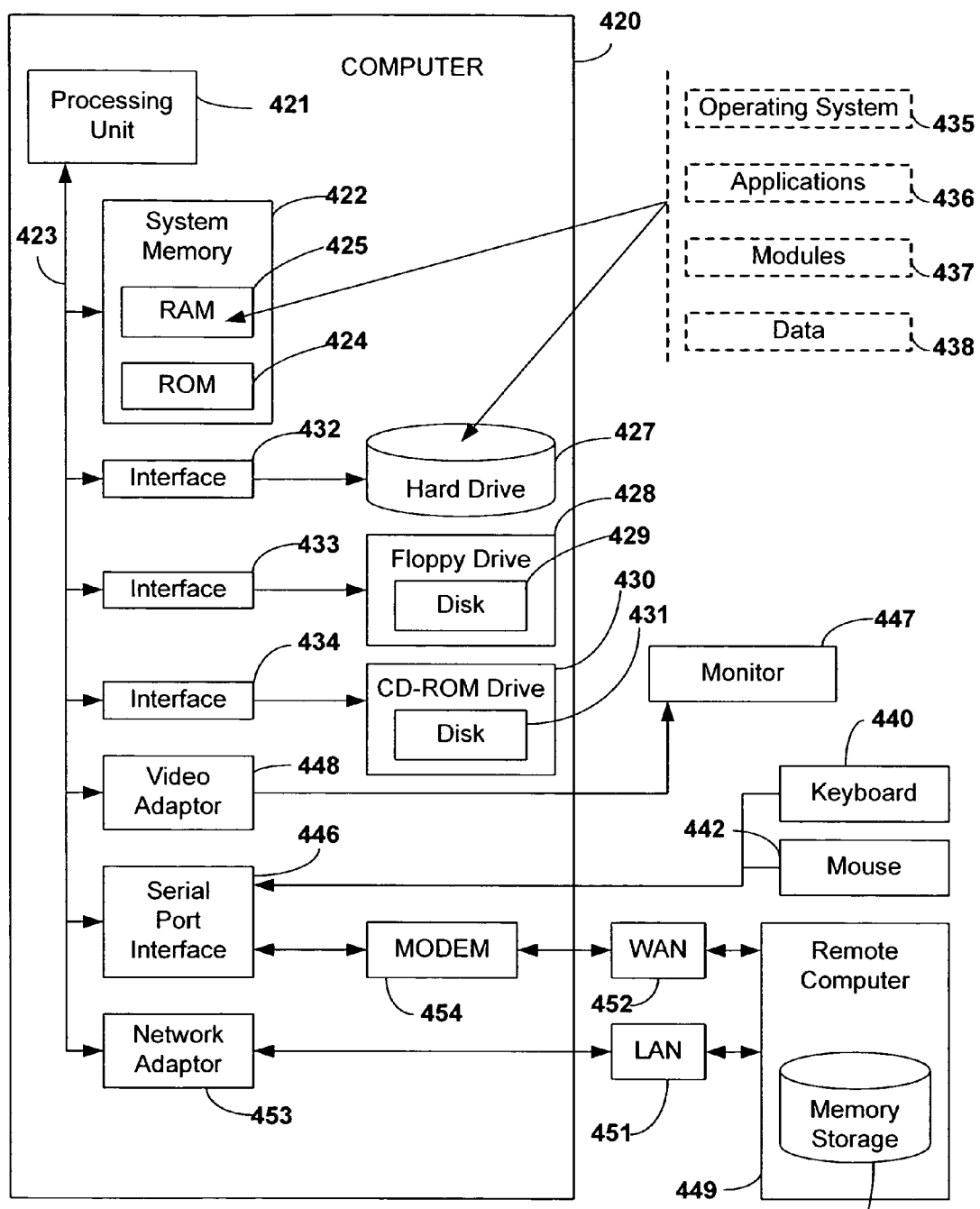
FIG. 9 illustrates a block diagram of a computer system in accordance with an environment of the present invention.

With reference to FIG. 9, an exemplary system for implementing the invention includes a conventional personal or server computer 420, including a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438. A user may enter commands and information into the computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote server or client computer 449. The remote computer 449 may be a workstation, a server computer, a router, a peer device or other common network node, and typically includes many or all of the elements described relative to the computer 420, although only a memory storage device 450 has been illustrated in FIG. 9. The logical connections depicted in FIG. 9 include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 420, unless indicated otherwise. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A method of garbage collection during execution of code on a machine, comprising:
   declaring at least one reference as pinned based on an unsafe condition;
   receiving a request for a garbage collection service;
   identifying references and pinned references in a process stack;
   tracing a memory heap employing the references and pinned references to determine inaccessible memory objects;
   removing the inaccessible memory objects from the heap; and
   relocating objects in the heap except for objects referenced by pinned references.

2. The method of claim 1, the pinned references being local variables referencing managed code during an executing call of unmanaged code.

3. The method of claim 1, the execution of code comprising executing both managed and unmanaged code.

4. The method of claim 1, the references and pinned references including interior references and the memory heap being segmented into a plurality of blocks wherein the garbage collection service traces interior references by scanning through the blocks until the block with the object containing the interior reference is found.

5. The method of claim 4, further comprising adding objects found accessible during the tracing of the memory heap to a graph.

6. The method of claim 1, wherein removing the inaccessible memory objects from the heap comprises shifting non-garbage objects down in the memory heap to eliminate inaccessible segments and modifying the references to refer to the new locations of the objects in the memory heap, while holding fixed in memory non-garbage objects referenced by pinned references.

7. A system for garbage collecting during execution of code on a machine, comprising:
   means for declaring references as pinned in response to an unsafe condition;
   means for storing the pinned references on a process stack;
   means for identifying object references and pinned references in the process stack; and
   means for performing a garbage collection, such that objects referenced by pinned references remained in a fixed location in a heap.

8. The system of claim 7, further comprising means for compiling both managed and unmanaged code in real-time and means for storing object references in the process stack and means for storing objects in the memory heap.

9. A system that facilitates garbage collection during execution of a code on a machine, comprising:
   a labeling component that selectively labels an object reference as pinned, the object reference references an object in a memory heap; and
   a garbage collection algorithm that analyzes the object and the object reference and alters location of data within the memory heap while maintaining location of the object within the memory heap based at least in part upon the analysis.

10. The system of claim 9, the object is a managed object called by unmanaged code.

11. The system of claim 9, the object reference labeled as pinned based at least in part upon an indication written into source code.

12. The system of claim 9, the object reference selectively labeled as pinned upon a request for utilization of the garbage collection algorithm.

13. The system of claim 9, further comprising a plurality of objects, each of the plurality of objects is characterized as one of managed and unmanaged objects, wherein object references corresponding to the plurality of objects are selectively pinned based at least in part upon the characterization.

14. The system of claim 13, the garbage collection algorithm reclaims at least a portion of the memory heap based at least in part upon the characterization.

15. The system of claim 13, the garbage collection algorithm reclaims at least a portion of the memory heap based at least in part upon an analysis of the pinned object references.

16. The system of claim 9, further comprising a compiler that receives unmanaged code, the unmanaged calls the object.

17. The system of claim 16, the compiler is a just-in-time compiler that compiles the unmanaged code in real-time.

18. The system of claim 17, the unmanaged code precompiled into an intermediate language code prior to being delivered to the just-in-time compiler.

19. The system of claim 17, the just-in-time compiler comprises a compiler that compiles managed code and a compiler that compiles unmanaged code.

20. The system of claim 16, the compiler labels an object reference as pinned given an unsafe condition.

21. The system of claim 9, the labeling component labels an interior pointer as pinned, the interior pointer references a location of a data member.

22. The system of claim 21, the garbage collection algorithm analyzes the interior pointer and maintains location of the data member based at least in part upon the analysis.

23. The system of claim 9, further comprising a plurality of object references that reference a plurality of objects in the memory heap, the garbage collection algorithm automatically alters location of one of the objects in the memory heap and adjusts an object reference that corresponds to the object to enable the object reference to point to the object at its altered location within the memory heap.

24. A method for garbage collection during execution of code on a machine, comprising:
   determining whether objects called by the code are managed;
   pinning object references that correspond to objects that are determined to be managed, wherein an;
   receiving a request for garbage collection services; and
   allocating memory within a memory heap to the code based at least in part upon the garbage collection services and the pinned object references, wherein objects corresponding to pinned references are not moved in memory during the allocating.

25. The method of claim 24, further comprising:
   generating a graph of objects that are called by the code; and
   allocating memory within the memory heap to the code based at least in part upon the generated graph.

26. The method of claim 24, further comprising compiling the code in real time.

27. The method of claim 24, further comprising pinning local variables based upon pre-defined criteria to prevent an unsafe condition from occurring.

28. The method of claim 24, further comprising labeling an object reference as pinned within the code.

* * * * *